United States Patent [19]

Maguire

[11] Patent Number: 4,628,730

[45] Date of Patent: Dec. 16, 1986

[54] EQUAL FLUID FLOW DISTRIBUTION SYSTEM AND MANIFOLD

[76] Inventor: James V. Maguire, 17001 Bluewater La., Huntington Beach, Calif. 92649

[21] Appl. No.: 667,431

[22] Filed: Nov. 1, 1984

[51] Int. Cl.[4] .............................................. G01F 7/00
[52] U.S. Cl. ...................................... 73/195; 73/198; 137/602; 236/94
[58] Field of Search ................. 73/118, 195, 198, 199; 137/602, 561 A; 165/11 R; 236/94 R

[56] References Cited

U.S. PATENT DOCUMENTS

| | | | |
|---|---|---|---|
| 3,175,578 | 3/1965 | Patterson et al. | 137/561 A |
| 3,724,522 | 9/1973 | Pogson | 137/561 A |
| 3,936,262 | 2/1976 | Hehl | 137/561 A |
| 4,280,360 | 7/1981 | Kobayashi et al. | 73/198 |
| 4,335,848 | 6/1982 | Eidejus | 236/94 |
| 4,502,325 | 3/1985 | Klomp | 73/118 |

Primary Examiner—Herbert Goldstein
Attorney, Agent, or Firm—Weber, Jr. G. Donald

[57] ABSTRACT

An equal flow, metering and manifold system which is used to control the flow of natural gas from a single source to a single utilization device via separate metering systems for a plurality of users which can independently and separately control the operation of the single utilization device.

10 Claims, 4 Drawing Figures

EQUAL FLUID FLOW DISTRIBUTION SYSTEM AND MANIFOLD

BACKGROUND

1. Field of the Invention

This invention is directed to metering devices, in general, and to a manifolding system which is used to assure equal and equitable metering of fluid flow through a plurality of separate systems from a common supply source to a common utilization device, in particular.

2. Prior Art

There are many known metering systems in the prior art. These metering systems are used to meter any number of things. In particular, in the area of fluid metering, there are also a number of devices and systems which are used to meter the flow of the fluid. In many cases, the meters are used as means for billing for the consumption of the fluid, such as in the case of natural gas. In this case, the meters are used to measure the total number of cubic feet of the fluid which is utilized. Other metering systems which measure the rate of consumption or other parameters are also known but are not of particular interest in the context of this invention.

One of the problems which plagues users of fluids, such as natural gas, is the method by which metering can be performed in a relatively inexpensive yet accurate fashion. This is especially a problem in the case of multiple users (or use controllers) in a single environment. One example is a developer or landlord having a single connection to the gas line main while having a number of tenants who use the gas thus supplied.

In some cases, it is relatively simple to use sub-metering systems wherein each of the units which is individually controlled by a tenant, is metered independently. This is relatively simple in the case of furnaces, gas stoves or the like. In this case, the sub-metering is relatively simple to perform because the heating or cooking units are separate and independent elements which are supplied or made available to the individual tenants. It is, typically, a relatively inexpensive and relatively easy matter to install, either initially or in retrofit applications.

However, in the case of large complexes, it is frequently difficult to provide a separate air conditioning unit to the domain of each of the tenants. This is usually very difficult and very expensive to implement whether initially or as a retrofit arrangement.

In the past what has usually happened is, a landlord, for example, provides a single air conditioning system, such as a cooling tower or the like, at the apartment complex and which services a number of units in the complex. In this case, the cooling tower is, typically, installed on the roof of the structure and the separate cooling lines are connected to supply chilled water to the actual "air conditioning devices" in the individual tenant units.

Inasmuch as each of the tenants has separate and independent control over the access to the chilled water which is provided by the cooling tower for the respective apartment or living unit, the amount of natural gas which has been used by the individual tenant has been very difficult to meter. In one solution, the landlord is required to provide a separate cooling tower for each of the apartment units so that individual control (and metering) could be obtained. In this case, the cost is prohibitive in the mere installation of the cooling towers whether at the initial instruction or as a retrofit.

The alternative which has normally been followed is that the landlord provides a single gas line connection to the cooling tower which is metered and charged to the landlord. Inasmuch as there is no easy method of calculating the individual usage by the tenants in the individual units, the landlord has had to make the payments for this gas usage and, if possible, pass it along to the tenants on a somewhat speculative basis, usually in the rent charge.

In many jurisdictions, this pass on of the cost for the natural gas has been either prohibited or severely constrained by legal requirements. Many consumer protection laws prevent the landlord from "guessing" at the actual utilization of the natural gas (or similar) product. In the past, it has been tried to connect the cooling tower through separate metering systems but this has proved to be very ineffective from a cost point of view. Moreover, with a single cooling tower, it is very difficult to accurately assign actual costs to individual tenants or users. As a consequence, the landlord has usually just absorbed the cost of this gas utilization as an overhead expense.

As a secondary consideration, when the individual tenant is not directly responsible for the cost of the gas which is used in the cooling procedures, the tenant tends to be careless about the use of the gas. As soon as a metering apparatus is provided, the utilization of the gas, especially for air conditioning purposes, has become much more restricted by the individual user.

As noted, because of the constraints and conditions placed on metering apparatus by many consumer protection agencies, weights and measures agencies or the like in various jurisdictions, a relatively simple, inexpensive, efficient and accurate metering system has been unavailable. As a consequence, the auxiliary costs and/or inefficient utilization of natural gas have occurred. These are undesirable conditions and a suitable device is needed in order to avoid these problems.

SUMMARY OF THE INVENTION

This invention is directed to a metering system wherein a relatively small, relatively inexpensive measurement chamber is provided. This chamber can be installed in new construction or in existing installations on a retrofit basis. Relatively minor adjustments or changes in the existing system are needed in order to make the subject invention operate in the most efficient manner.

In brief, a manifold mixing chamber is inserted, in-line between the currently existing individual metering systems which are used for other purposes (such as measurement of heating and cooking gas) and the existing cooling tower. The chamber permits the cooling tower to be operated upon a request from a single unit or whenever a plurality of units are requesting operation of the cooling tower. Moreover, the system permits the equal mixing and sharing of the natural gas so that the existing metering systems operate on a fair and accurate sharing measurement scheme.

DESCRIPTION OF A PREFERRED EMBODIMENT

Figure 1:
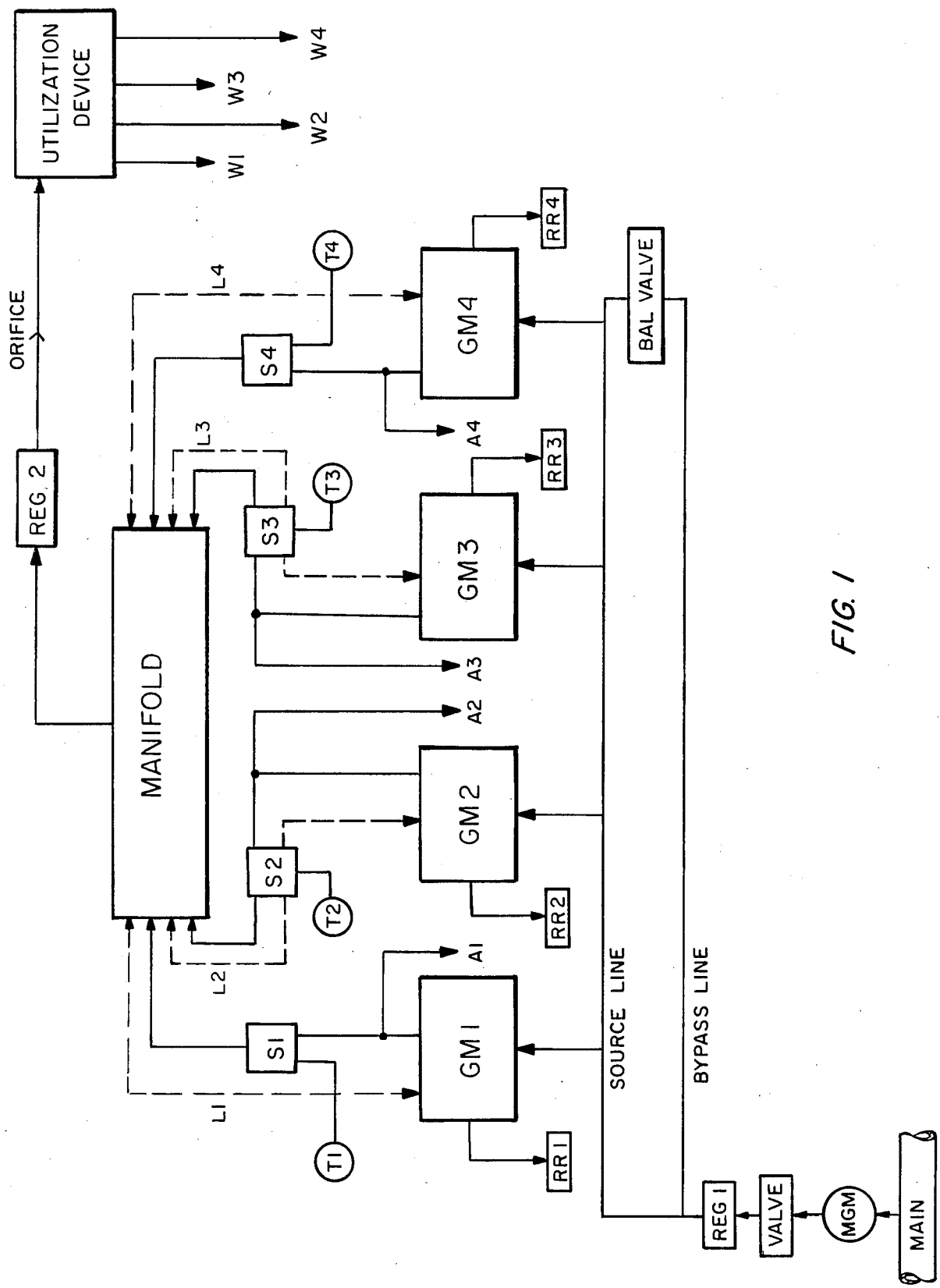
FIG. 1 is a schematic representation of a metering system using the manifold of the instant invention.

Referring now to FIG. 1, there is shown a schematic representation of one embodiment of a monitoring and metering system in accordance with the instant invention. In this diagram, a control system for four separate units (apartments or the like) is shown. The system is not limited to four units but this is a convenient number for illustrative purposes.

The system incorporates the supply (MAIN) which is used to supply the natural gas or other fluid which is to be monitored. The supply main is connected to a main gas meter NGN which is then connected, in-line, with a shutoff valve (VALVE) or the like which controls the flow of gas from the main into the unit. A pressure regulator (REG1) is frequently used to control the pressure at the user's location. For example, the main is typically maintained at a pressure of three PSI while the pressure within a unit is, commonly, reduced to approximately 8.5 inches of water column pressure.

In this embodiment, the fluid from the regulator is supplied to a source line (SOURCE) and to a bypass line (BYPASS). These lines are teed from each other at the input end and joined to each other at a remote location through a balance valve (BAL. VALVE). The purpose of the balance valve is to assure that the pressure in the source line is constant or uniform throughout. Without the bypass line, there would be a natural attenuation of pressure from the input end to the remote output end of the source line. However, with a bypass line feeding pressure into the remote end, through the balance valve, the pressue in the source line can be maintained constant or uniform through the entire length thereof.

A plurality of meters (in this case gas meters), which are designated GM1 through GM4, are connected to the source line through appropriate plumbing. The meters GM1 through GM4 are typical, known types of meters which are readily available in the art. In fact, this type of meter is frequently used to meter the flow of fluid in other systems.

The outputs of the meters GM1 through GM4 are connected to inputs at the opposite ends of the MANIFOLD via respective solenoids S1, S2, S3 and S4. The output of the MANIFOLD is connected to the UTILIZATION DEVICE, in this case an air conditioning cooling tower, via a regulator REG2, if necessary. The utilization device provides, in this case, four output lines W1 through W4 through which chilled water is applied to air conditioning coils in respective apartments or units which are to be selectively cooled. Also, as shown in FIG. 1, the output from the respective meters GM1 through GM4 provides an additional output A1 through A4. These outputs (A1 through A4) are representative of the individual gas lines to the respective apartments and are used to supply the natural gas for the individual and separate cooking and heating units associated with the apartments.

In addition, a separate thermostat T1, T2, T3 and T4 is provided in each of the respective apartments or units. These individual thermostats are connected with the associated solenoids S1, S2, S3 and S4.

Also, a remote read-out unit RR1, RR2, RR3 or RR4 can be provided in the event that the entire system is placed at a remote location, for example on the roof of the building in question. Thus, the meter reading can be effected at a reasonably accessible location.

Briefly, the connection from the MAIN through the SOURCE line is typical in the prior art. However, in the prior art, the bypass line has usually not been included inasmuch as the desirability for constant pressure at the respective metering devices has not been of significance.

Moreover, in the prior art, the connection to the utilization device or air conditioning tower has usually been a direct line from the output of the regulator REG1 to the input of the utilization device. Thus, any gas which is fed to the utilization device to cause operation thereof has been monitored solely at the main gas meter MGM. This has, previously, been the case inasmuch as there was no accurate method to determine, by means of meters GM1 through GM4, which of the respective apartments or units was calling for the supply of gas to the utilization device.

In the instant invention, it is shown that utilization device receives its input from the MANIFOLD. The manifold receives its inputs from the respective gas meters which receive their inputs from the source line. This is accomplished in addition to the ordinary gas feed line to the other gas appliance in the apartment and without interruption or interference therewith.

In operation, each of the solenoids S1 through S4 is controlled by its respective thermostat T1 through T4. In essence, when a particular thermostat, for example, thermostat T4, indicates that additional chilled water W4 is required in the appropriate apartment, the thermostat supplies a signal to solenoid S4 which is operated so that gas now passes from the source line through meter GM4, through solenoid S4, through the MANIFOLD to the UTILIZATION DEVICE. Thus, the utilization of gas by the resident of apartment unit 4 is recorded on meter GM4. Likewise, if the resident of apartment 1, 2 or 3 causes the respective thermostat to provide a signal to the respective solenoid, gas flows from the source line through the respective meter GM1, GM2 or GM3 to the manifold and then to the utilization device.

However, problems tend to arise when more than one thermostat activates more than one solenoid. For example, if apartments 3 and 4 are calling for cooling via chilled water input W3 and W4, utilization device is merely operative to continue to provide chilled water to each of these lines. The amounts of usage of the chilled water must be reflected, somehow, to the readings at the meters GM3 and GM4. While it is clear that such a reading will take place only when the solenoids S3 and/or S4 are open so as to permit gas flow through meters GM3 and GM4, a monitoring device is required to assure that an even distribution of utilization of natural gas is made relative to the respective meters. This function is provided by the manifold. That is, the manifold is constructed to assure that equalized gas utilization is effected by the utilization device. That is, the manifold assures that when thermostats T3 and T4 have activated solenoids S3 and S4, the gas which flows through these respective meters is equal. A situation wherein all of the gas flows through meter GM3 and none through GM4 (or some variation in between) is avoided.

Figure 2:
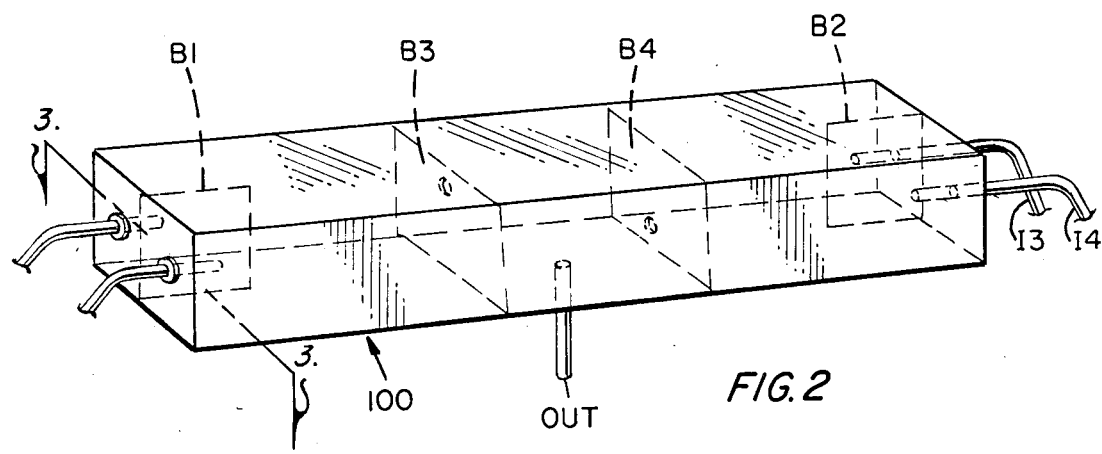
FIG. 2 is a diagram of the manifold of the instant invention.

Referring now to FIG. 2, there is shown a partially broken away, perspective view of the manifold. In this instance, the manifold is a substantially rectangular tube 100 which is fluid tight. In a preferred embodiment, the tube 100 is about 3 inches square and about 48 inches long. A plurality of inputs I1, I2, I3, and I4 are shown. These inputs correspond to the input lines which are supplied from the respective solenoids.

It is seen that the manifold is divided into three main chambers. The middle chamber is defined by two transverse barriers, B3 and B4 which have the perimeters thereof joined to the sides of the manifold through welding, forming or the like. In the preferred embodiment, the middle chamber is about 4 inches long. Each of the these baffles B3 and B4 has a relatively small aperture, about 5/16 inches in diameter, provided therein. In the case shown in FIG. 2, the aperture in baffle B3 is disposed in the top portion thereof while the aperture in baffle B4 is disposed in the bottom portion thereof. These apertures are the only means of communication with the other chambers. Also, in the bottom surface of the middle chamber, there is provided an outlet aperture which is connected to an outlet tube (OUT) or similar plumbing which is connected to the utilization device shown in FIG. 1.

Each of the end chambers is substantially similar in configuration. That is, each of these chambers receives the respective plurality of input lines, for example, I1 and I2 or I3 and I4. These inlets are coupled into the chamber by means of a suitable coupling which extends about 2½ inches into the chamber and beyond the surface of the end plate.

Disposed intermediate the input coupling devices are baffles B1 and B2, respectively. These baffles are also joined to the end plate and the respective top and bottom plates of the manifold structure. These baffles extend into the chambers about 3 inches and are used to provide a means for channeling the direction of the fluid as it is input into the manifold.

Figure 3:
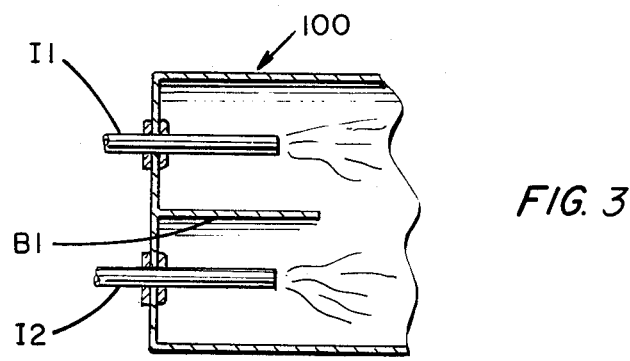
FIG. 3 is a cross-sectional view of one end of the manifold shown in FIG. 2.

Referring now to FIG. 3, there is shown a top, cross-sectional view of one end of the manifold. In this embodiment, gas is shown to be flowing into the manifold through the input I2. As is seen, the gas tends to expand and disperse very rapidly to fill the inner chamber of the manifold. However, baffle B1 tends to divert much of this gas back into a somewhat laminar flow through the manifold. It should be noted that precise laminar flow is not produced nor is it required in the instant invention.

Of course, it should be understood that baffle B1 will produce the same effect relative to gas which is supplied to the manifold via inlet I1. If gas is supplied through both inlets I1 and I2 at the same time, the same net effect occurs with the gases tending to mix and flow in a somewhat laminar condition toward the center of the chamber of the manifold. However, it should be noted that in this case, laminar flow is not required and substantial turbulence and mixing at the inner end of the respective chambers is permissible and, perhaps, even desirable.

Figure 4:
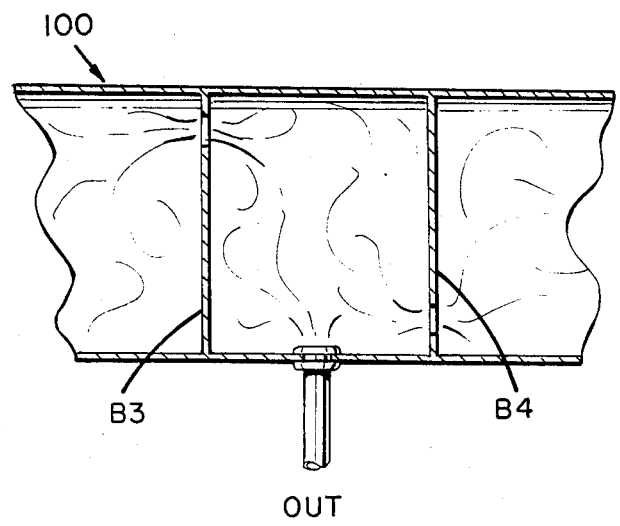
FIG. 4 is a cross-sectional view of the mid-portion of the manifold shown in FIG. 2.

Referring now to FIG. 4, there is shown a cross-sectional view of the center portion of the manifold. In this case, the gas is seen to have mixed and formed a cloud or pool or the like at the interior end of the outer chambers. In view of the flow pressure, the gas tends to flow through the apertures in baffles B3 and B4. As noted, the aperture in baffle B3 is disposed near the upper portion of the baffle while the aperture in baffle B4 is disposed near the lower portion thereof. This arrangement of the apertures prevents gas flow through one of the apertures from providing a back pressure or a counter pressure at the other aperture which could prevent proper flow at both ends of the manifold.

Assuming, as shown in FIG. 4, that gas is supplied through one or both of the end chambers, the gas passes through the respective apertures (individually or together) and disperses within the center chamber, and ultimately, again because of the pressure, exits through the output line. In the preferred embodiment, the output line is mounted substantially flush with the interior surface of the manifold so that the gas will naturally tend to "fall" into the outlet pipe or conduit.

As noted above, the manifold will receive gas only when one or more of the solenoids S1 through S4 is operated by its respective thermostat. When the solenoid is activated, the gas is supplied to the manifold. If only one solenoid is activated, the gas will pass routinely through the manifold, for example, from input I1, past baffle B1 through the aperture in baffle 3 and out the output conduit. This will be reflected by operation of meter GM1.

In the instance when a plurality of solenoids S1 through S4 are activated, gas will be supplied through the respective inputs, will tend to mix in the respective end chambers and in the center chamber and then move directly through the outlet line to the utilization device. It is clear that the utilization device is a "single burner" unit and can only burn a given amount of gas to perform its operational function. Thus, whether only one or all four of the inlets are supplying gas to the outlet, the outlet line can only carry a fixed, constant amount of gas. As a consequence, back pressures tend to build up in the chamber wherein the gas flow through all of the solenoids (and, thus, all of the meters) is reduced. Inasmuch as the manifold and its connection arrangement cause the reduction in flow to be directly proportional to the number of suppliers, each of the suppliers provides an equal share or equal amount of the gas. Obviously, when one of the solenoids closes, the number of suppliers is reduced and the proportion of the gas which is supplied by each of the remaining suppliers is increased. In this way, an equal sharing of the gas usage is achieved. This is reflected by an equal, proportional charge for the amount of gas used as determined by the meter readings.

In the typical example, the length of line from each of the meters to the manifold is constant. That is, the line length L1 is equal to the line length L2, which is equal to the line length L3, which is equal to the line length L4. Inasmuch as the manifold is symmetrically constructed, the constant line length is maintained from the meter through to the outlet line. Of course, the single outlet line continues the constancy of the line lengths.

Thus, there is shown and described a new and unique monitoring and metering system and device for use with multiple users who can control the operation of a single utilization device. The invention provides for the retrofit of existing systems as well as the construction of new systems. In addition to using many components of already existing plumbing or metering arrangements, the manifolding device permits a sure and accurate apportionment of the charges for the utilization of the gas or other fluid in question. Various tests have been conducted under the parameters set out by the California Weights and Measures Department to assure that the apportionment is equal and accurate. To date these tests have all provided satisfactory results.

It is clear that those skilled in the art may conceive of modifications to this invention. The modifications can take the form of any number of changes in the configuration of the manifold device, for example. Moreover, the dimensions given are exemplary only and are not limitative, per se. However, any such modifications which fall within the purview of this description, are intended to be included therein as well. This description is intended to be illustrative only and is not intended to be limitative of the invention. The scope of this application is limited only by the claims appended hereto.

I claim:

1. A fluid monitoring system for establishing accurate uniform metering of fluid flow comprising,
    source means,
    utilization means,
    metering means for measuring fluid flow from said source means to said utilization means, and
    manifold means connected to said metering means between said source means and said utilization means to equilibrate the fluid flow through said metering means,
    said manifold means comprises an elongated tubular member having a plurality of inputs connected to said metering means and at least one output connected to said utilization means,
    said inputs are disposed in the opposite ends of said tubular member and said output is disposed at the midpoint of one side of said tubular member.

2. The system recited in claim 1 wherein,
    said metering means includes a plurality of individual metering devices connected between said source means and said utilization means.

3. The system recited in claim 2 including,
    control means connected to said metering means and operative to selectively permit fluid flow through said metering means.

4. The system recited in claim 3 wherein,
    said control means includes a separate control device individually associated with each of said metering devices.

5. The system recited in claim 4 wherein,
    each said control device comprises a solenoid connected in series between said metering device and said manifold means.

6. The system recited in claim 1 wherein,
    said manifold means includes at least two interior baffles disposed transverse the long dimension of said tubular member between said inputs and on opposite sides of said output.

7. The system recited in claim 6 wherein,
    said manifold means includes at least one baffle between each pair of inputs at each end of said tubular member and aligned with the axis of said tubular member.

8. The system recited in claim 6 wherein,
    each of said interior baffles includes an aperture therein to pass fluid therethrough.

9. The system recited in claim 8 wherein,
    the apertures in said interior baffles are not aligned with each other.

10. The system recited in claim 1 wherein said manifold comprises,
    an elongated tubular member having a plurality of inputs and at least one output,
    said inputs are disposed in the opposite ends of said tubular member and said output is disposed at the midpoint of one side of said tubular member,
    said manifold means includes at least two interior baffles disposed transverse to the long dimension of said tubular member between said inputs and on opposite sides of said output,
    said manifold means further includes at least one baffle disposed between each pair of inputs at each end of said tubular member and aligned with the axis of said tubular member,
    each of said interior baffles includes an aperture therein to pass fluid therethrough,
    the apertures in said interior baffles are not aligned with each other.

* * * * *